(12) United States Patent
Polaganga et al.

(10) Patent No.: US 12,016,047 B1
(45) Date of Patent: Jun. 18, 2024

(54) ACCESS TECHNOLOGY AVOIDANCE FOR A COMMUNICATION SESSION

(71) Applicant: T-Mobile Innovations LLC, Overland Park, KS (US)

(72) Inventors: Roopesh Kumar Polaganga, Bothell, WA (US); Deepak Nadh Tammana, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 119 days.

(21) Appl. No.: 17/406,624

(22) Filed: Aug. 19, 2021

(51) Int. Cl.
*H04W 72/541* (2023.01)
*H04W 24/02* (2009.01)
*H04W 48/18* (2009.01)

(52) U.S. Cl.
CPC ......... *H04W 72/541* (2023.01); *H04W 24/02* (2013.01); *H04W 48/18* (2013.01)

(58) Field of Classification Search
CPC ... H04W 72/541; H04W 24/02; H04W 48/18; H04W 36/00; H04W 36/0085; H04W 36/0088; H04W 36/0094; H04W 36/36
See application file for complete search history.

(56) References Cited

U.S. PATENT DOCUMENTS

| | | | |
|---|---|---|---|
| 11,317,299 B1* | 4/2022 | Shread | H04W 52/0251 |
| 2015/0038159 A1* | 2/2015 | Fang | H04W 48/16 |
| | | | 455/452.2 |
| 2020/0404556 A1* | 12/2020 | Avraham | H04B 17/318 |
| 2021/0120468 A1* | 4/2021 | Stauffer | H04W 8/12 |
| 2021/0315023 A1* | 10/2021 | Tesanovic | H04W 72/56 |
| 2022/0330122 A1* | 10/2022 | Srivastava | H04W 76/12 |
| 2023/0010533 A1* | 1/2023 | Sambhwani | H04W 76/20 |

* cited by examiner

*Primary Examiner* — Wayne H Cai
(74) *Attorney, Agent, or Firm* — Shook, Hardy & Bacon L.L.P.

(57) ABSTRACT

The technology described herein improves communication quality and device efficiency by selecting an access technology for use in a communication session between a user equipment (UE) and a communication network. The access technologies may be selected by a network node (e.g., eNodeB) based on a geographic location of the UE within a service area. In some geographic areas, the 5G leg may perform below a threshold quality measure, while the LTE leg performs well. In these situations, maintaining a communication session with only the LTE leg may yield a better overall performance (e.g., data throughput) than using the combination of a 5G leg and an LTE leg. The first step of the selection process is identifying geographic areas with below threshold 5G performance. Once the geographic subunits are designated as high or low performing, the designations are used to determine whether LTE and 5G should be used in combination.

19 Claims, 6 Drawing Sheets

ACCESS TECHNOLOGY AVOIDANCE FOR A COMMUNICATION SESSION

CROSS-REFERENCE TO RELATED APPLICATIONS

None.

SUMMARY

At a very high level, the technology described herein improves communication quality and device efficiency by selecting an access technology or combination of access technologies for use in a communication session between a UE and a communication network. The access technologies may be selected by a network node (e.g., eNodeB) based on a geographic location of the UE within a service area provided by the network node. In some locations, multiple access technologies may be available and some communication sessions will utilize multiple access technologies in a single session. Areas where two or more access technologies are available may be described as overlapping coverage areas herein. For example, a communication session may comprise an LTE leg and a 5G leg when both technologies are available. The LTE leg may serve as the anchor leg through which signaling and communication session management occurs, while the 5G leg may carry data. In some instances, data is split between 5G and LTE legs.

In some geographic areas, the 5G leg may perform below a threshold quality measure due to interference or some other cause, while the LTE leg performs well. In these situations, maintaining a communication session with only the LTE leg may yield a better overall performance (e.g., data throughput) than using the combination of a 5G leg and an LTE leg. In essence, the theoretical benefit of the higher data throughput provided by the 5G leg may not be consistently realized in certain geographic locations. In these locations, an LTE leg would perform better than a 5G leg in several aspects. For example, maintaining an active 5G leg that is not performing up to capacity may use more energy on the UE (depleting a battery) than using just an LTE leg since maintaining a single leg may require less radio usage than maintain two legs (i.e., both a 5G and LTE leg). Similarly, the 5G leg that is not performing up to capacity makes an inefficient use of limited radio frequencies available to a 5G node. For example, the radio frequency dedicated for use carrying a below capacity 5G leg in one part of a coverage area could be used for a full capacity 5G leg in a different part of the coverage area.

The first step of the selection process is identifying geographic areas with below threshold 5G performance. The geographic areas may take the form of hexbins of a various sizes. In one aspect, a service provider generates a hexbin map for its service areas. Each access node may use the same hexbin map to define geographic subunits of the node's service area. However, different nodes may assign different performance scores to the same hexbin based on unique performance data received by the node. Each node may gather performance data from UE's operating in a coverage area provided by the node. The performance data may be analyzed to determine areas with below a threshold performance measure. These areas (e.g. hexbins) may be designated as low performance geographic subunits of a coverage area. The nodes making the performance quality determination may not provide 5G coverage themselves, but may still gather 5G performance data through the LTE leg provided by the node. LTE nodes that manage a 5G connection provided by a 5G node located elsewhere, may be described as non co-located LTE nodes.

Once the geographic subunits of a node's overlapping coverage area (an area where both LTE and 5G coverage are available) are designated as either high or low performing, the designations can be used to determine whether LTE and 5G should be used in combination. In low performing areas, only LTE may be used. In high performing areas, 5G may be used in combination with LTE. The communication session can be managed to avoid use of 5G by dropping a 5G leg when a UE enters a low performing service area. Data from the communication session may then be communicated only over the LTE leg. In another aspect, the UE is not sent a 5G configuration message when located in a low performing area. Not sending a configuration message may differ from a default practice that automatically sends a 5G configuration message when 5G is available.

BRIEF DESCRIPTION OF THE DRAWINGS

Illustrative embodiments of the present invention are described in detail below with reference to the attached drawing figures, and wherein.

DETAILED DESCRIPTION

Figure 1:
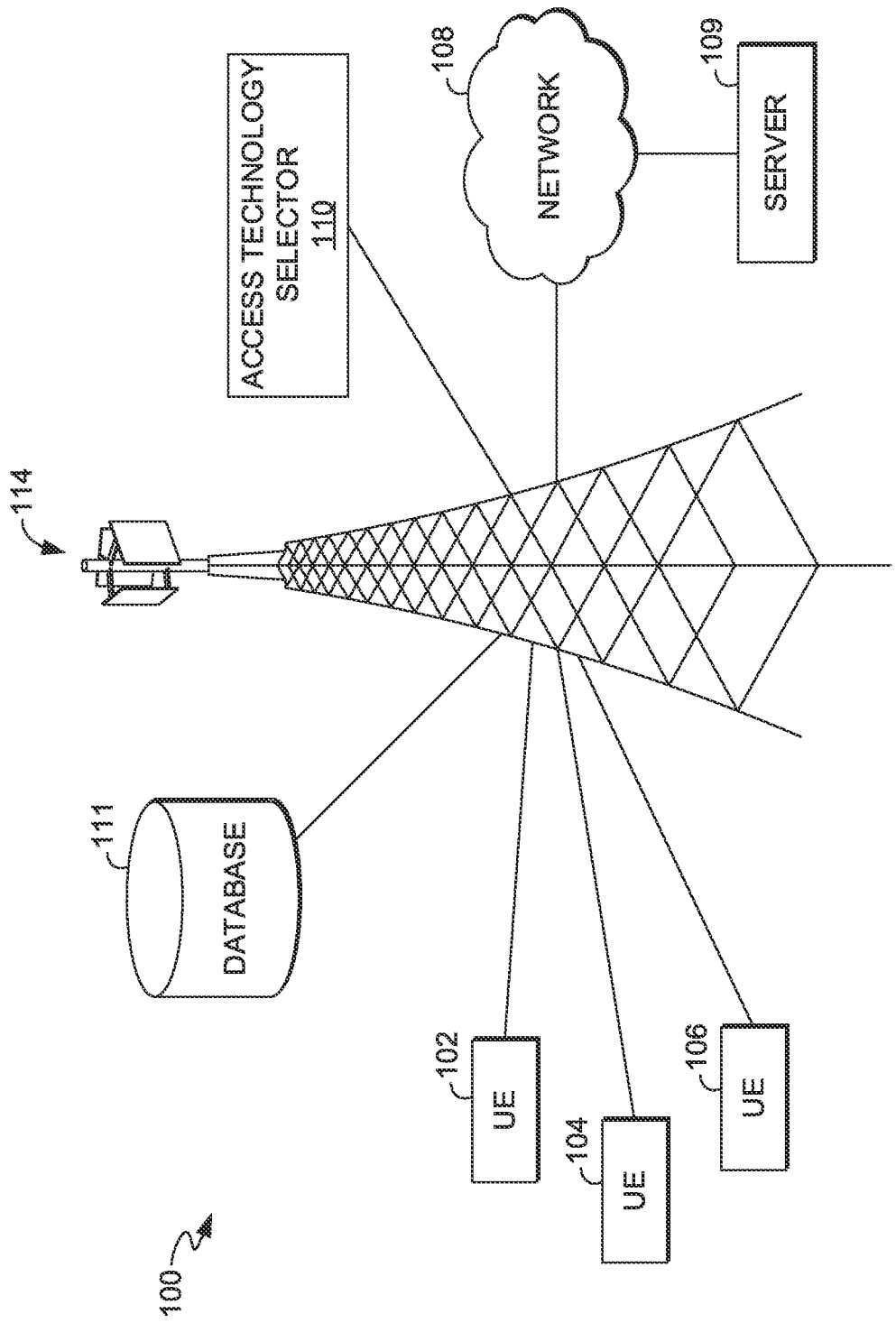
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |

-continued

| | |
|---|---|
| 5G | Fifth-Generation Cellular Communication System |
| BS | Base Station |
| BTS | Base Transceiver Station |
| CD-ROM | Compact Disk Read Only Memory |
| CDMA | Code Division Multiple Access |
| CDMA2000 | Code Division Multiple Access 2000 |
| DL | Downlink |
| eNodeB | Evolved Node B |
| FDD | Frequency Division Duplex |
| gNodeB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| HSDPA | High-Speed Downlink Packet Access |
| IoT | Internet of Things |
| LED | Light Emitting Diode |
| LTE | Long Term Evolution |
| MD | Mobile Device |
| MME | Mobility Management Entity |
| PC | Personal Computer |
| PCS | Personal Communications Service |
| PDA | Personal Digital Assistant |
| RAM | Random Access Memory |
| RF | Radio-Frequency |
| RFI | Radio-Frequency Interference |
| ROM | Read Only Memory |
| SMS | Short Message Service |
| TDD | Time Division Duplex |
| TDMA | Time Division Multiple Access |
| TXRU | Transceiver (or Transceiver Unit) |
| UE | User Equipment |
| UL | Uplink |
| UMTS | Universal Mobile Telecommunications Service |
| QCI | Quality of Service Class Identifier |
| VoLTE | Voice over Long-Term Evolution |
| WCDMA | Wideband Code Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary, 31st Edition (2018).

At a very high level, the technology described herein improves communication quality and device efficiency by selecting an access technology or combination of access technologies for use in a communication session between a UE and a communication network. The access technologies may be selected by a network node (e.g., eNodeB) based on a geographic location of the UE within a service area provided by the network node. In some locations, multiple access technologies may be available and some communication sessions will utilize multiple access technologies in a single session. Areas where two or more access technologies are available may be described as overlapping coverage areas herein. For example, a communication session may comprise an LTE leg and a 5G leg when both technologies are available. The LTE leg may serve as the anchor leg through which signaling and communication session management occurs, while the 5G leg may carry data. In some instances, data is split between 5G and LTE legs.

The comparatively large amount of data that can be communicated over a 5G leg makes the use of a 5G leg desirable when available. In many communication networks that have 5G capabilities, the use of a 5G leg may be the default arrangement. The technology described herein may alter the default arrangement when the 5G connection is likely to fall below a quality threshold (e.g., below a threshold of capacity) and cause a communication session not to use 5G access technologies. The elimination of a 5G leg may limit the communication session to use of non-5G technologies, such as LTE. Whether a 5G connection is likely to fall below a quality threshold may be determined by analyzing performance data gathered from UEs in different geographic locations. Quality measures may be determined for different subunits of a coverage area and used to select the optimal access technology for a UE's location.

In some geographic areas, the 5G leg may perform below the threshold quality due to interference or some other cause, while the LTE leg performs well. In these situations, maintaining a communication session with only the LTE leg may yield a better overall performance (e.g., data throughput) than using the combination of a 5G leg and an LTE leg. In essence, the theoretical benefit of the higher data throughput provided by the 5G leg may not be consistently realized in certain geographic locations. In these locations, an LTE leg would perform better than a 5G leg in several aspects. For example, maintaining an active 5G leg that is not performing up to capacity may use more energy on the UE (depleting a battery) than using just an LTE leg since maintaining a single leg may require less radio usage than maintain two legs (i.e., both a 5G and LTE leg). Similarly, the 5G leg that is not performing up to capacity makes an inefficient use of limited radio frequencies available to a 5G node. For example, the radio frequency dedicated for use carrying a below capacity 5G leg in one part of a coverage area could be used for a full capacity 5G leg in a different part of the coverage area.

The first step of the selection process is identifying geographic areas with below threshold 5G performance. The geographic areas may take the form of hexbins of a various sizes. In one aspect, a service provider generates a hexbin map for its service areas. Each access node may use the same hexbin map to define geographic subunits of the node's service area. However, different nodes may assign different performance scores to the same hexbin based on unique performance data received by the node. Each node may gather performance data from UE's operating in a coverage area provided by the node. The performance data may be analyzed to determine areas with below a threshold performance measure. These areas (e.g. hexbins) may be designated as low performance geographic subunits of a coverage area. The nodes making the performance quality determination may not provide 5G coverage themselves, but may still gather 5G performance data through the LTE leg provided by the node. LTE nodes that manage a 5G connection provided by a 5G node located elsewhere, may be described as non co-located LTE nodes.

An area designated as a low performance area by one node may be designated as a high performance node by a second node that also provides coverage to the same hexbin. For example, a first and second node may both provide LTE coverage to an area with 5G coverage provided by third node. It may be that the frequencies used by the first node cause interference with the 5G coverage while the frequencies used by the second node do not. In this scenario, the first node may designate the area as a low performing area, while the second node designated the same area as a high-performing area.

Once the subunits of a node's overlapping coverage area (an area where both LTE and 5G coverage are available) are designated as either high or low performing, the designations can be used to determine whether LTE and 5G should be used in combination. In low performing areas, only LTE may be used. In high performing areas, 5G may be used in combination with LTE. The communication session can be managed to avoid 5G by dropping a 5G leg when a UE enters a low performing service area. Data from the communication session may then be communicated only over the LTE leg. In another aspect, the UE is not sent a 5G configuration message when located in a low performing area. The 5G configuration message informs the UE how to set up a 5G communication session from the UE's current location. Not sending a configuration message may differ from a default practice that automatically sends a 5G configuration message when 5G is available.

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to computing device 600 described herein with respect to FIG. 6.

Referring to FIG. 1, an exemplary network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, node, base transceiver station (also known as a base station), communication tower, a small cell, or the like), network 108, server 109, access technology selector 110, and database 111. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 600 of FIG. 6) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

The access technology selector 110 determines whether a communication session should be initiated on a single access technology or multiple technologies. The selection process used by the access technology selector 110 is described in detail elsewhere herein, for example, with reference to FIGS. 2-5. At a high level, the access technology selector 110 may determine geographic subunits of an overlapping coverage area that have low performance on one of the two access technologies. In these low performing subareas, only one technology may be enabled by a node controlling the communication session. The control leg may be described as the anchor leg.

Preliminarily, a determination may be made that the UE is located at a point in the communication network served by two or more access technologies, such as 5G and LTE. An additional determination may be made that the UE is able to access the network on the two or more access technologies (i.e., is 5G and LTE capable). Additionally, the type of communication session may dictate whether the selection process is initiated. In one aspect, the selection process is initiated when the communication session is for a phone call, videoconference, or other real time exchange of live audio or video data. In contrast, when the communication session is for streaming a song or video the selection process may be skipped or any recommendation generated from the selection process down weighted. The reason for this is that the user is less likely to experience a noticeable disruption while streaming a song or video because of buffering, among other factors, than when engaging a live exchange of information.

Next, the access technology selector 110 determines whether the UE is in a high performing or low performing subunit of its coverage area. Each node may be associated with a access technology selector 110. Further, each node may designated each subunit in its overlapping coverage area as either high or low performing.

In one aspect, the UE is not sent an access technology configuration instruction when it enters a low performance area. If the UE is in a geographic area designated as a low performance area then the eNodeB may not send a message to the UE asking the UE to configure for eNDC. A configuration message may be sent to the UE when the UE leaves the low performance area and enters a high performance area. In another aspect, an existing 5G leg is discontinued and data traffic previously carried on the 5G leg moved to an LTE node.

Figure 2:
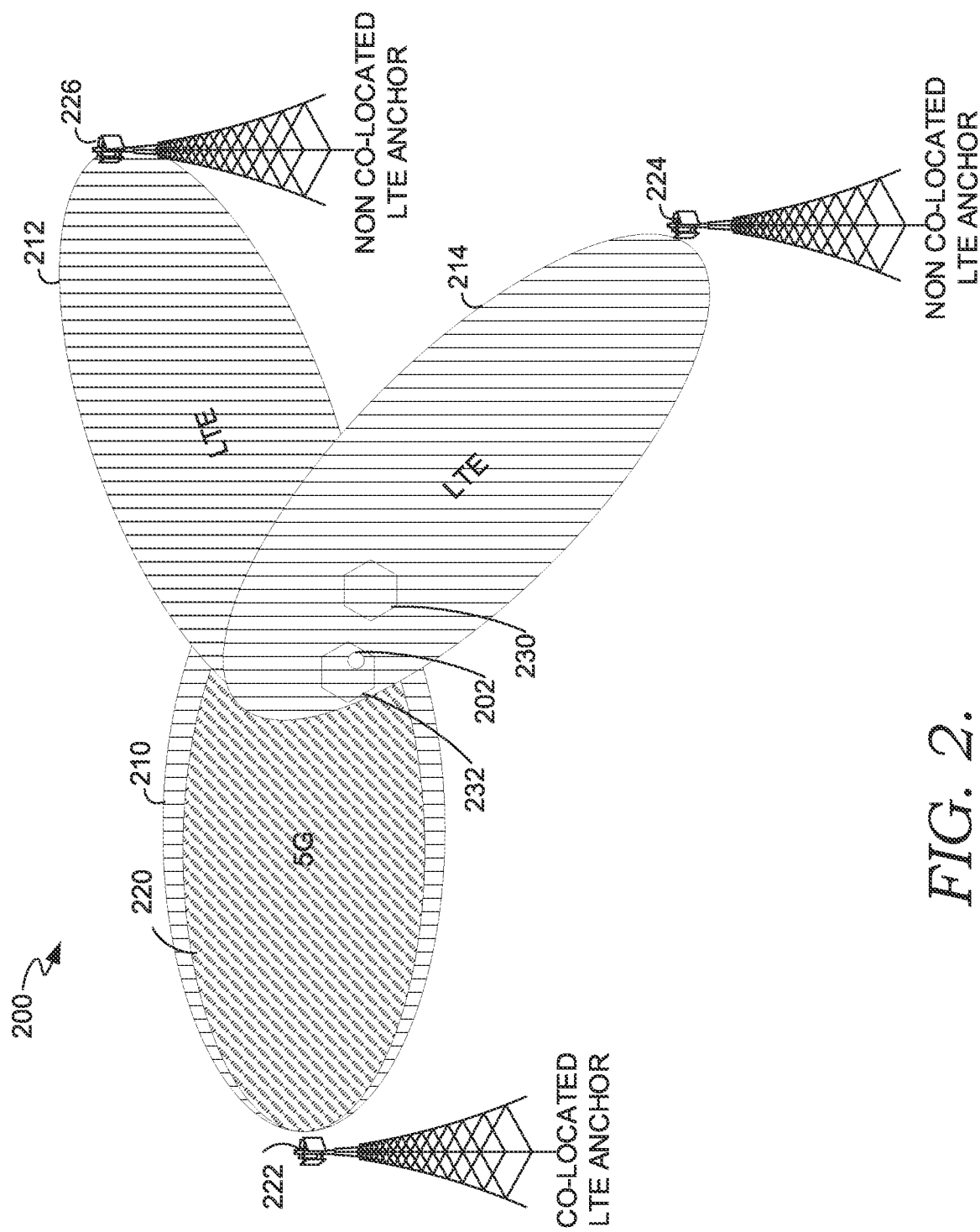
FIG. 2 depicts an exemplary coverage area with overlapping access technology coverage areas, according to an implementation of an embodiment of the present invention.

In FIG. 2, a wireless telecommunications network 200 is shown with LTE coverage areas 210, 212, and 214. LTE coverage areas 210, 212, and 214 may comprise a BTS to transmit and receive RF signals with UEs, such as UE 202. In FIG. 2, LTE coverage areas 210, 212, and 214 define an area where RF signals are transmitted using the LTE access technology and received by an access point. LTE coverage area 210 is enabled by an eNodeB at BTS 222, which is described as a co-located LTE anchor because a 5G node is also located at BTS 222. LTE coverage area 214 is enabled by an eNodeB at BTS 224, which is described as a non co-located LTE anchor because a 5G node is not located at BTS 224. LTE coverage area 212 is enabled by an eNodeB at BTS 226, which is described as a non co-located LTE anchor because a 5G node is not located at BTS 226.

FIG. 2 also includes 5G coverage area 220. 5G coverage area 220 may comprise a BTS to transmit and receive RF signals with UEs, such as UE 202. In FIG. 2, 5G coverage area 220 defines an area where RF signals are transmitted using 5G access technology and received by an access point for communication purposes. 5G coverage area 220 is enabled by an gNodeB at BTS 222.

FIG. 2 illustrates a context in which aspects the technology described herein may help avoid a disruption of the user experience. The UE 202 is located within LTE coverage areas 210, 212, and 214 and 5G coverage area 220. With the UE 202 in this location, a determination may be made whether a communication session should use both LTE and 5G technology. In this context, the two technologies do not have overlapping coverage in much of the area depicted, but overlapping coverage can be provided by three different combinations around UE 202. In each combination, the 5G leg originates at BTS 222 and is represented by 5G-coverage area 220. The LTE leg can be provided by the eNodeB at BTS 222, 224, or 226.

The eNodeBs at BTS 222, 224, and 226 may each have their own designation for the geographic subunit of the coverage area in which UE 202 is located. The designation is based on performance data gathered by each respective eNodeB. Hexbin 230 and hexbin 232 are both located in whole, or in part, in coverage areas 210, 212, 214, and 220. UE 202 is located within hexbin 230. Each of the nodes at BTS 222, 224, and 226 could assign their own performance designation to hexbin 230 and hexbin 232. For example, the BTS 222 could designate hexbin 230 as high performing, while the BTS 224 designates hexbin 230 as low performing. The different designation is a result of different performance data gathered by the two BTSs. As mentioned, each BTS may gather performance data when the BTS is managing the communication session. In other aspects, the performance data may be shared between different BTSs.

The performance data can measure various characteristics of a communication session related to quality. A set of performance data may be collected by each eNodeB from UEs operating in its coverage area. The characteristics include 5G availability, 5G throughput, and 5G retainability. Measuring other performance characteristics is possible and these three are just provided as an example. In one aspect, an average or mean performance measure is calculated for each geographic subunit in a coverage area. Thus, an average 5G availability, average 5G throughput, and average 5G retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In an aspect, the normalized measures could be combined in such a way that gives different weight to different characteristics.

A high or low performance designation is assigned by comparing the measured performance to a threshold. In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below the threshold.

The thresholds may be set based on a number of factors. The thresholds may be based on available alternatives. For example, when using just LTE is possible, the threshold may be set to determine when using just an LTE leg will produce more data throughput than a below capacity 5G leg. Similarly, the threshold for any individual characteristic may be set by comparing the performance of the LTE leg by itself with the LTE leg and the diminished quality 5G leg performing together. The threshold can be set to trigger use of the LTE leg by itself when the 5G leg performs at a level where the LTE leg by itself is better than the combined 5G leg and LTE leg.

Figure 3:
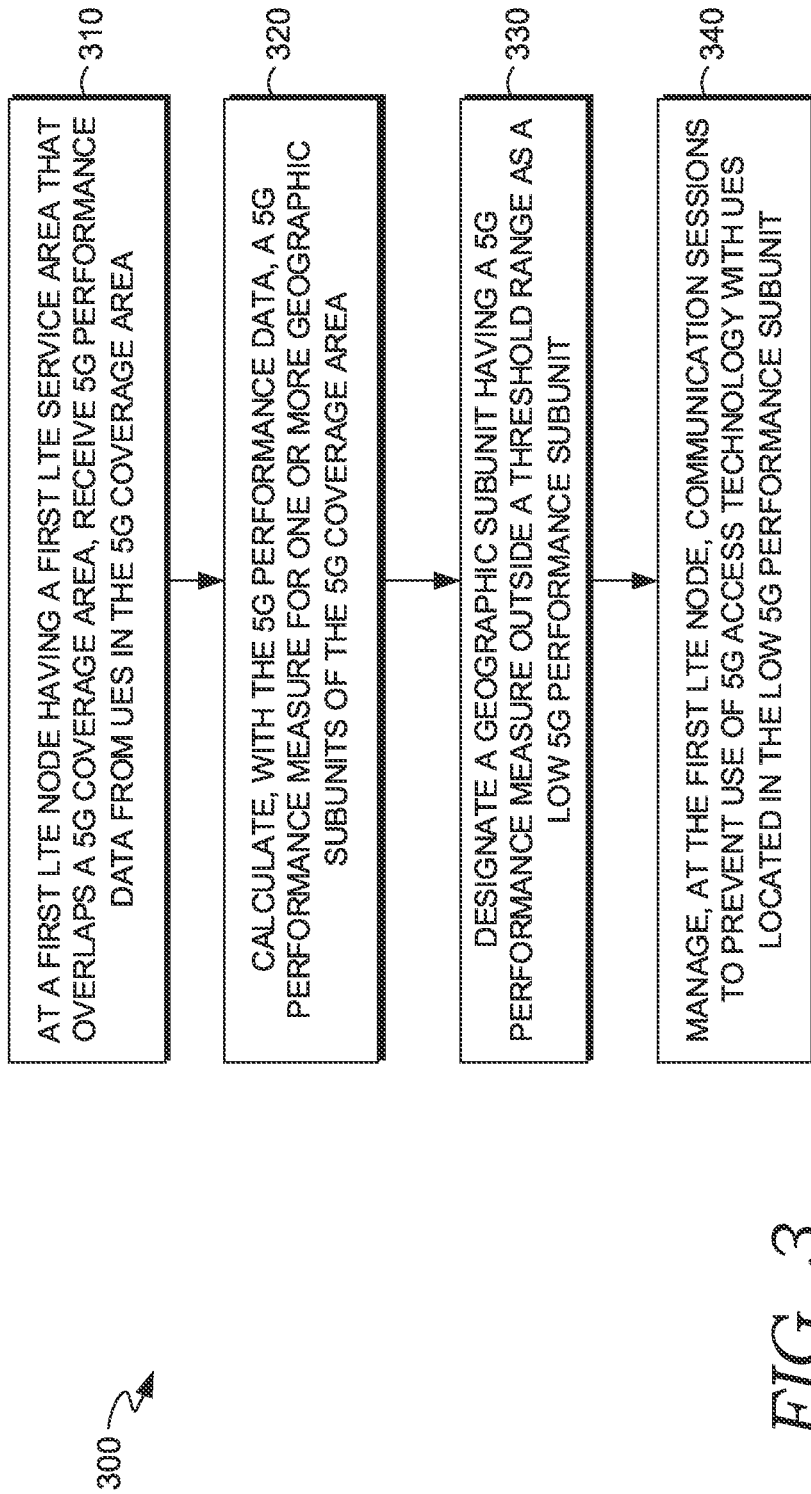
FIGS. 3-5 show methods for avoiding interference by selecting an access technology for use during a communication session between a user equipment (UE) and a communication network that is capable of communication with two or more access technologies.
Figure 4:
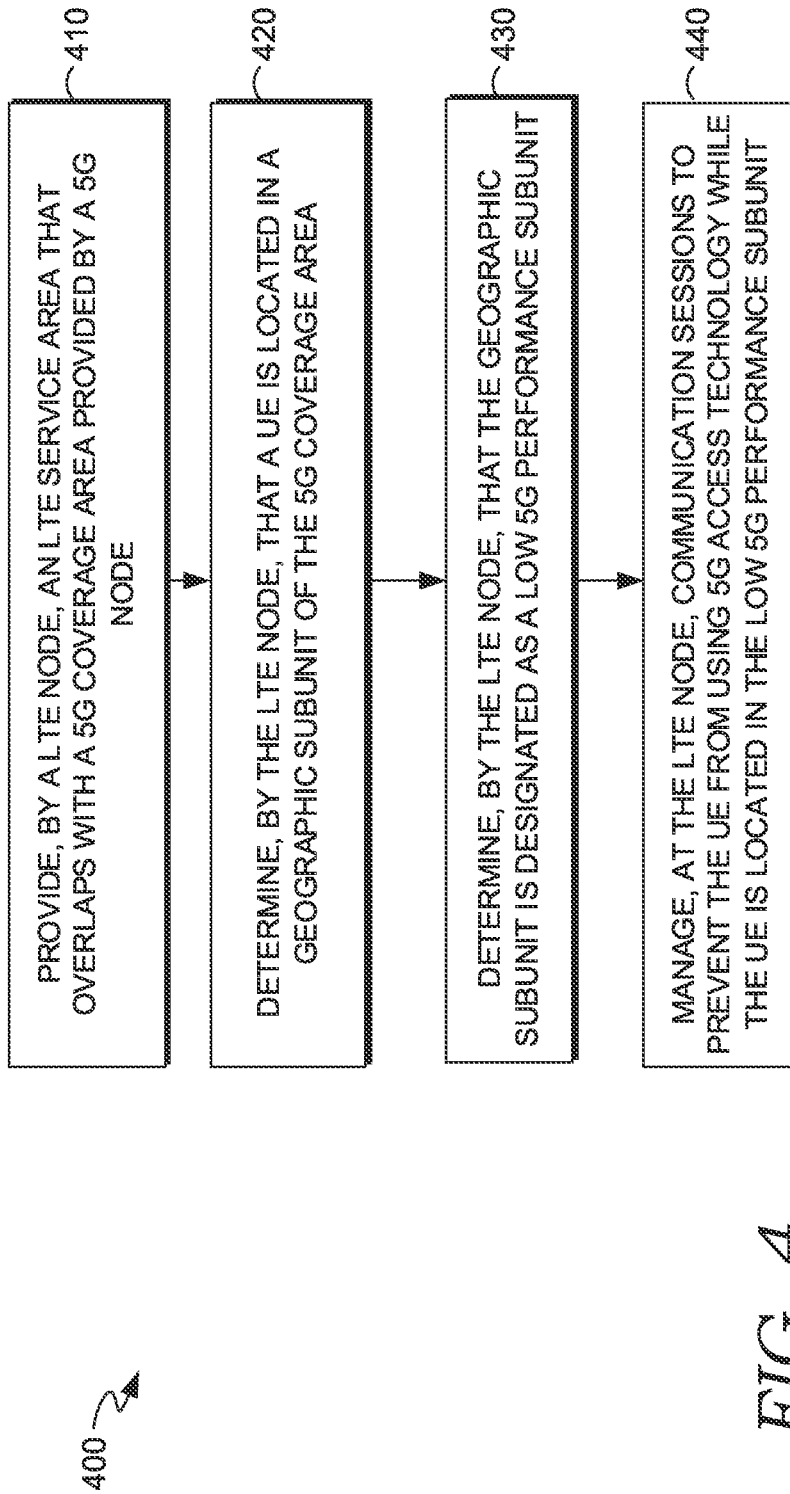
Figure 5:
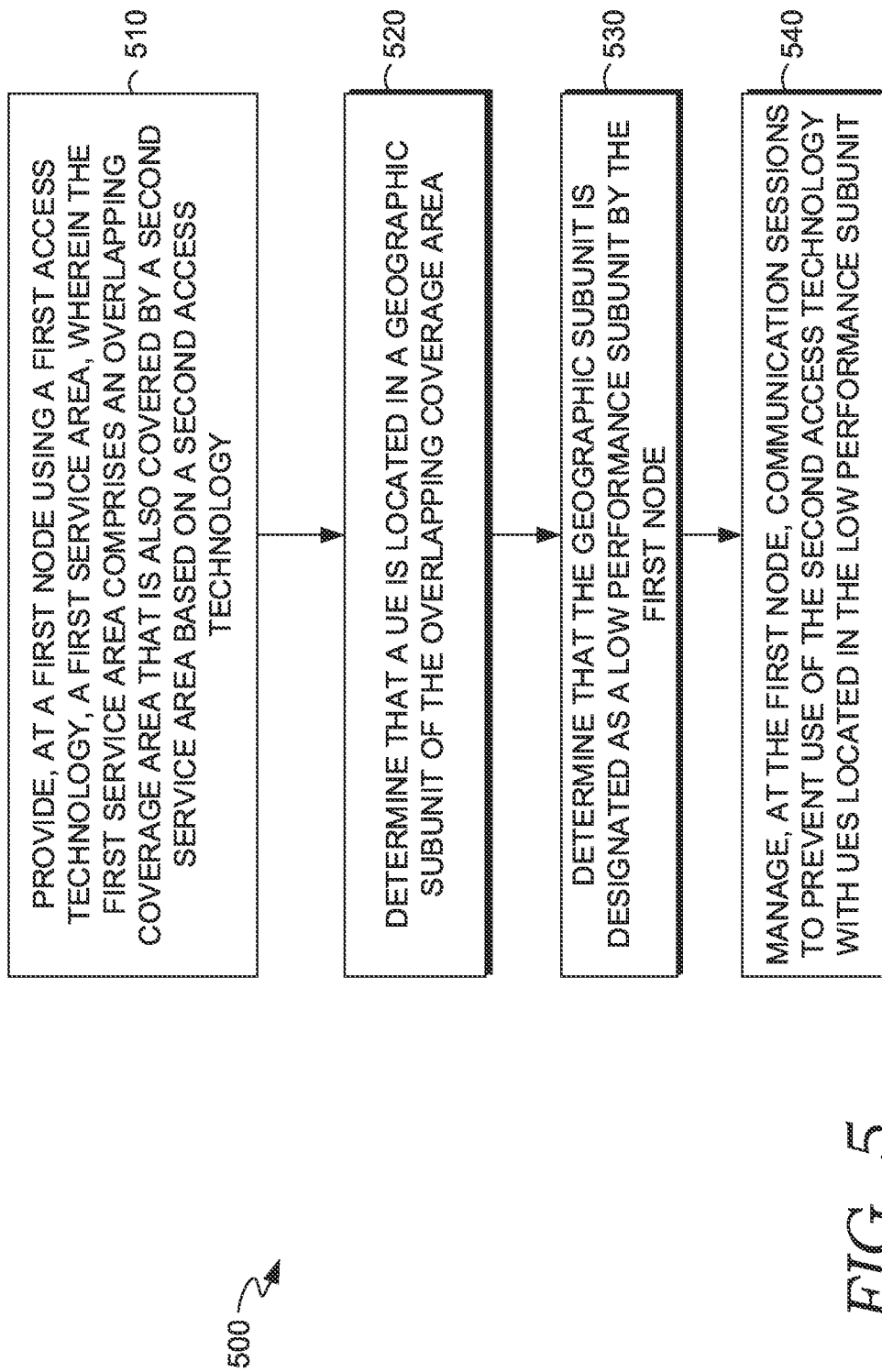

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 300, 400, and 500 are described, by way of example, with respect to the access technology selector 110 of FIG. 1 and additional features of FIG. 2. However, these methods may additionally or alternatively be executed by any one system, or any combination of systems, including, but not limited to, those described herein.

FIG. 3 is a flow diagram showing a method 300 for avoiding interference by selecting an access technology for use during a communication session between a user equipment (UE) and a communication network that is capable of communication with two or more access technologies, in accordance with some embodiments of the present disclosure.

At step 310, the method includes, at a first LTE node having a first LTE service area that overlaps a 5G coverage area, receiving 5G performance data from UEs in the 5G coverage area. The performance data can measure various characteristics of a communication session related to quality. A set of performance data may be collected by each eNodeB from UEs operating in its coverage area. The characteristics include 5G availability, 5G throughput, and 5G retainability. Measuring other performance characteristics is possible and these three are just provided as an example.

At step 320, the method includes calculating, with the 5G performance data, a 5G performance measure for one or more geographic subunits of the 5G coverage area. In one aspect, an average or mean performance measure is calculated for each geographic subunit in a coverage area. Thus, an average 5G availability, average 5G throughput, and average 5G retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In another aspect, the normalized measures could be combined in such a way that gives different weight to different characteristics.

At step 330, the method includes designating a geographic subunit having a 5G performance measure outside a threshold range as a low 5G performance subunit. The thresholds may be set based on a number of factors. The threshold may be based on available alternatives. For example, when using just LTE is possible, the threshold may be set to determine when using just an LTE leg will produce more data throughput than a below capacity 5G leg. Other measures are possible.

In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below the threshold.

At step 340, the method includes managing, at the first LTE node, communication sessions to prevent use of 5G access technology with UEs located in the low 5G performance subunit. In one aspect, the UE is not sent an access technology configuration instruction when it enters a low performance area. If the UE is in a geographic area designated as a low performance area then the eNodeB may not send a message to the UE asking the UE to configure for eNDC. A configuration message may be sent to the UE when the UE leaves the low performance area and enters a high performance area. In another aspect, an existing 5G leg is discontinued and data traffic previously carried on the 5G leg moved to an LTE node.

FIG. 4 is a flow diagram showing a method 400 for avoiding interference by selecting an access technology for use during a communication session between a user equipment (UE) and a communication network that is capable of communication with two or more access technologies, in accordance with some embodiments of the present disclosure.

At step 410, the method includes providing, by a LTE node, an LTE service area that overlaps with a 5G coverage area provided by a 5G node.

At step 420, the method includes determining, by the LTE node, that a UE is located in a geographic subunit of the 5G coverage area.

At step 430, the method includes determining, by the LTE node, that the geographic subunit is designated as a low 5G performance subunit. The location of the UE may be determined from location information provided by the UE. The location can be used to associate the UE with a hexbin or other subunit measure. The designation previously assigned to the hexbin (e.g., geographic subunit) can then looked up from a data store, such as table.

In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below the threshold.

At step 440, the method includes managing, at the LTE node, communication sessions to prevent the UE from using 5G access technology while the UE is located in the low 5G performance subunit. In one aspect, the UE is not sent an access technology configuration instruction when it enters a low performance area. If the UE is in a geographic area designated as a low performance area then the eNodeB may not send a message to the UE asking the UE to configure for eNDC. A configuration message may be sent to the UE when the UE leaves the low performance area and enters a high performance area. In another aspect, an existing 5G leg is discontinued and data traffic previously carried on the 5G leg moved to an LTE node.

FIG. 5 is a flow diagram showing a method 500 for avoiding interference by selecting an access technology for use during a communication session between a user equipment (UE) and a communication network that is capable of communication with two or more access technologies, in accordance with some embodiments of the present disclosure.

At step 510, the method includes providing, at a first node using a first access technology, a first service area, wherein the first service area comprises an overlapping coverage area that is also covered by a second service area based on a second access technology. The first node could be an eNodeB. The second service could be provided by a second node, such as a gNodeB, which is a 3GPP-compliant implementation of the 5G-NR base station. The second node may not be co-located with the first node.

At step 520, the method includes determining that a UE is located in a geographic subunit of the overlapping coverage area. This determination may be made by analyzing location data (e.g., GPS data) from a UE and comparing it to a coverage area map.

At step 530, the method includes determining that the geographic subunit is designated as a low performance subunit by the first node. The thresholds may be set based on a number of factors. The threshold may be based on available alternatives. For example, when using just LTE is possible, the threshold may be set to determine when using just an LTE leg will produce more data throughput than a below capacity 5G leg. Other measures are possible.

In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below the threshold.

At step 540, the method includes managing, at the first node, communication sessions to prevent use of the second access technology with UEs located in the low performance subunit. In one aspect, the UE is not sent an access technology configuration instruction when it enters a low performance area. If the UE is in a geographic area designated as a low performance area then the eNodeB may not send a message to the UE asking the UE to configure for eNDC. A configuration message may be sent to the UE when the UE leaves the low performance area and enters a high performance area. In another aspect, an existing 5G leg is discontinued and data traffic previously carried on the 5G leg moved to an LTE node.

Figure 6:
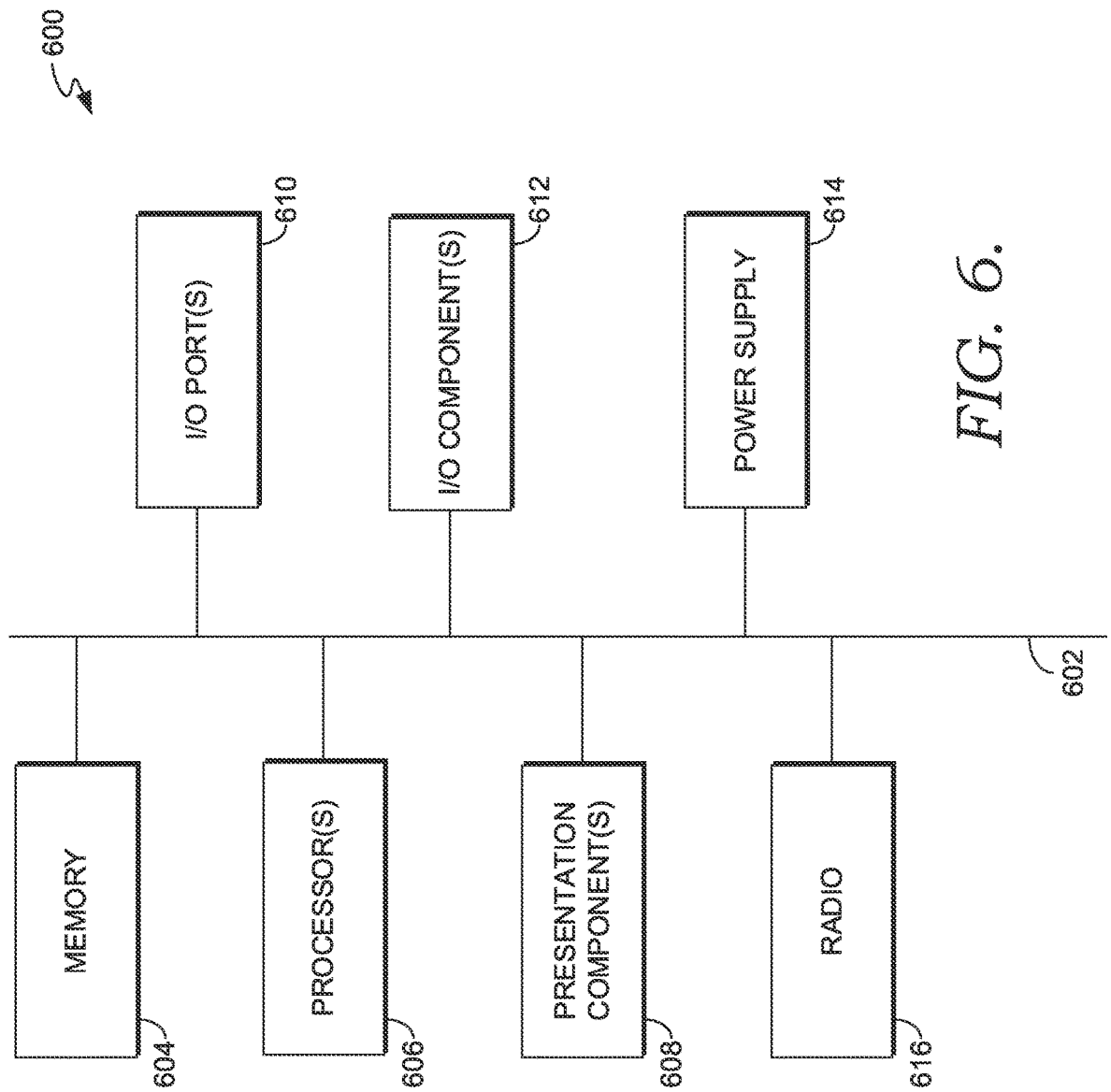
FIG. 6 depicts a block diagram of an exemplary computing environment suitable for use in implementing embodiments herein.

With reference to FIG. 6, computing device 600 includes a bus 602 that directly or indirectly couples the following devices: memory 604, one or more processors 606, one or more presentation components 608, input/output (I/O) ports 610, input/output (I/O) components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 6 is merely illustrative of an example computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 612. Presentation component(s) 608 present data indications to a user or other device. Example presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, W-CDMA, EDGE, CDMA2000, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies.

The invention claimed is:

1. A method for avoiding interference by selecting an access technology for use during a communication session between a user equipment (UE) and a communication network that is capable of communication with two or more access technologies, comprising:
   at a first Long Term Evolution (LTE) node having a first LTE service area that overlaps a Fifth-Generation Cellular Communication System (5G) coverage area, receiving 5G performance data from a plurality of UEs in the 5G coverage area to form aggregate 5G performance data;
   calculating, with the aggregate 5G performance data, a 5G performance measure for one or more geographic subunits of the 5G coverage area;
   designating a geographic subunit having a 5G performance measure outside a threshold range as a low 5G performance subunit;
   managing, at the first LTE node, communication sessions to prevent use of 5G access technology with UEs located in the low 5G performance subunit
   at a second LTE node having a second LTE coverage area that overlaps the 5G coverage area, receiving a second set of 5G performance data from the UEs in the 5G coverage area;
   calculating, with the second set of 5G performance data, 5G performance measures for the one or more geographic subunits of the 5G coverage area;
   designating the geographic subunit as a high 5G performance subunit for the second LTE node because the 5G performance measure for the geographic subunit is inside the threshold range; and
   managing, at the second LTE node, communication sessions to allow use of 5G with UEs located in the high 5G performance subunit.

2. The method of claim 1, wherein the 5G coverage is provided by a 5G node that is not co-located with the first LTE node.

3. The method of claim 1, wherein the managing comprises not communicating a 5G configuration to the UEs located in the low 5G performance subunit.

4. The method of claim 1, wherein the managing comprises dropping a 5G leg of an existing communication session with a UE located in the low 5G performance subunit and continuing the existing communication session on LTE only until the UE is located outside the low 5G performance subunit.

5. The method of claim 1, wherein the 5G performance data comprises throughput on 5G legs.

6. The method of claim 1, wherein the threshold is threshold throughput.

7. The method of claim 1, wherein the one or more geographic subunits are hexagonal bins.

8. A method for avoiding interference by selecting an access technology for use during a communication session between a user equipment (UE) and a communication network that is capable of communication with two or more access technologies, comprising:
   providing, by a first Long Term Evolution (LTE) node, a first LTE service area that overlaps with a Fifth-Generation Cellular Communication System (5G) coverage area provided by a 5G node;
   determining, by the first LTE node, that the UE is located in a geographic subunit of the 5G coverage area;
   determining, by a second LTE node, that the UE is located in a second LTE service area provided by the second LTE node;
   determining, by the first LTE node, that the geographic subunit is designated as a low 5G performance subunit;
   determining, by the second LTE node, that the geographic subunit is designated as a high 5G performance subunit;
   managing, at the second LTE node, communication sessions to enable the UE to use 5G access technology while the UE is located in the high 5G performance subunit.

9. The method of claim 8, wherein the method further comprises the first LTE node designating the geographic subunit as interfered based on 5G performance measures collected by the first LTE node from UEs in the 5G coverage area.

10. The method of claim 9, wherein the 5G performance data comprises availability of 5G.

11. The method of claim 8, wherein individual LTE nodes in the communication network determine a performance designation of geographic subunits within coverage areas provided by the individual LTE nodes.

12. The method of claim 8, wherein the managing comprises dropping a 5G leg of an existing communication session with the UE located in the low 5G performance subunit and continuing the existing communication session on LTE only until the UE is located outside the low 5G performance subunit.

13. The method of claim 8, wherein the managing comprises not communicating a 5G configuration to the UEs located in the low 5G performance subunit.

14. The method of claim 8, wherein the 5G node is not co-located with the first LTE node.

15. One or more non-transitory computer storage media comprising computer executable instructions embodied thereon, which when executed by a computing device cause the computing device to perform a method for avoiding interference by selecting an access technology for use during a communication session between a user equipment (UE) and a communication network that is capable of communication with two or more access technologies, comprising:
   providing, at a first node using a first access technology, a first service area, wherein the first service area comprises an overlapping coverage area that is also covered by a second service area based on a second access technology;
   providing, at a second node using the first access technology, a third service area, wherein the service area comprises an overlapping coverage area that is also covered by the first service area and the second service area;
   determining that a UE is located in a geographic subunit of the overlapping coverage area;
   determining that the geographic subunit is designated as a low performance subunit by the first node;
   determining that the geographic subunit is designated as a high performance subunit by the second node;
   managing, at the first node, communication sessions to prevent use of the second access technology with UEs located in the low performance subunit, while connected to the first node.

16. The media of claim 15, wherein the second service area is provided by a second node that is not co-located with the first node.

17. The media of claim 15, wherein the managing comprises dropping a leg of an existing communication session with a UE located in the low performance subunit.

18. The media of claim 15, wherein the second access technology is 5G.

19. The media of claim 15, wherein the managing comprises not communicating an instruction to configure the second access technology to the UEs located in the low performance subunit.

\* \* \* \* \*